US012069416B2

(12) United States Patent
Hu

(10) Patent No.: US 12,069,416 B2
(45) Date of Patent: Aug. 20, 2024

(54) SCREEN SOUNDING DEVICE AND MANUFACTURING METHOD THEREOF

(71) Applicant: Shenzhen China Star Optoelectronics Semiconductor Display Technology Co., Ltd., Shenzhen (CN)

(72) Inventor: Xiaobo Hu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/622,075

(22) PCT Filed: Dec. 14, 2021

(86) PCT No.: PCT/CN2021/137731
§ 371 (c)(1),
(2) Date: Dec. 22, 2021

(87) PCT Pub. No.: WO2023/024336
PCT Pub. Date: Mar. 2, 2023

(65) Prior Publication Data

US 2024/0031711 A1 Jan. 25, 2024

(30) Foreign Application Priority Data

Aug. 24, 2021 (CN) ......................... 202110972580.0

(51) Int. Cl.
*H04R 1/02* (2006.01)
*H04R 31/00* (2006.01)

(52) U.S. Cl.
CPC ............. *H04R 1/023* (2013.01); *H04R 31/00* (2013.01); *H04R 2499/11* (2013.01); *H04R 2499/15* (2013.01)

(58) Field of Classification Search
CPC .... H04R 1/023; H04R 31/00; H04R 2499/11; H04R 2499/15
(Continued)

(56) References Cited

U.S. PATENT DOCUMENTS

2010/0084661 A1* 4/2010 Hwang ............... H01L 27/1288
257/E21.414

FOREIGN PATENT DOCUMENTS

CN 104469632 A 3/2015
CN 109068245 A 12/2018
(Continued)

OTHER PUBLICATIONS

International Search Report in International application No. PCT/CN2021/137731,mailed on May 23, 2022.
(Continued)

*Primary Examiner* — Ammar T Hamid
(74) *Attorney, Agent, or Firm* — PV IP PC; Wei Te Chung; Zhigang Ma

(57) ABSTRACT

A screen sounding device and a display device are disclosed. The screen sounding device includes a sounding structure. The sounding structure includes a first electrode, an insulating layer, and a second electrode stacked in sequence. A sounding cavity is formed between a vibrating portion of the second electrode and the insulating layer. The first electrode and the second electrode receive different driving signals, and the vibrating portion can drive the air in the sounding cavity to vibrate and sound. The screen sounding device of the present disclosure has a desirable sounding effect, various setting positions, and low manufacturing costs.

16 Claims, 3 Drawing Sheets

(58) Field of Classification Search
USPC .................................................. 381/332, 333
See application file for complete search history.

(56) References Cited

FOREIGN PATENT DOCUMENTS

| | | | |
|---|---|---|---|
| CN | 111430412 | A | 7/2020 |
| CN | 112087541 | A | 12/2020 |
| CN | 112887880 | A | 6/2021 |
| CN | 113784241 | A | 12/2021 |

OTHER PUBLICATIONS

Written Opinion of the International Search Authority in International application No. PCT/CN2021/137731,mailed on May 23, 2022.

Chinese Office Action issued in corresponding Chinese Patent Application No. 202110972580.0 dated Apr. 1, 2023, pp. 1-8.

* cited by examiner

SCREEN SOUNDING DEVICE AND MANUFACTURING METHOD THEREOF

CROSS-REFERENCE TO RELATED APPLICATION

This application is a national phase application under 35 U.S.C. § 371 of PCT Application No. PCT/CN2021/137731, filed Dec. 14, 2021, which claims priority to Chinese Application No. 202110972580.0, filed Aug. 24, 2021, the contents of which are incorporated herein by reference in their entirety.

FIELD OF INVENTION

The present disclosure relates to the field of display technologies, and in particular, to a screen sounding device and a manufacturing method thereof.

BACKGROUND OF INVENTION

As the most important component of a smart phone, the screen has undergone earthshaking changes in the past few years, and the screen-to-body ratio of the mobile phone screen is also increasingly large. Based on the requirements for the full screen and the non-porous screen of the mobile phone, the conventional technology of forming the earpiece hole on the mobile phone to sound is no longer suitable for the requirements for the full screen and the non-porous screen of the mobile phone at this stage. Therefore, the screen sounding technology has emerged at the historic moment.

Compared with the conventional built-in speakers, the screen sounding technology, as a surface audio technology, provides a new solution for multimedia audio-visual device sound. The screen sounding technology refers to the use of an exciter to convert audio electrical signals to mechanical vibrations of the display screen, and sound waves are generated by the vibration to achieve the purpose of sounding. The screen sounding technology directly uses the screen vibration for sounding, and the screen has the dual functions of a display and a speaker without requiring the external speaker. Therefore, the screen sounding technology meets the requirement for a full-screen design.

In the conventional screen sounding technology, one scheme is to attach the exciter to the middle frame of the mobile phone. This technology has a poor sounding effect and significant waste of energy consumption. Another scheme is to punch a hole on the screen, and then attach the vibrator to the hole to form a sounding microcavity. However, this method is more costly, punching the hole on the screen substrate results in weakening of the strength of the display substrate or the display panel, and it is difficult to guarantee the yield rate of the punching process.

In the process of research and practice of the prior art, the applicant of the present disclosure has developed a screen sounding device and a manufacturing method thereof, to resolve the above technical problems.

SUMMARY OF INVENTION

Technical Problem

Embodiments of the present disclosure provide a screen sounding device and a manufacturing method thereof, and a display device. The screen sounding device has a desirable sounding effect, various setting positions, and low manufacturing costs.

Technical Solution

A screen sounding device includes a substrate and a sounding structure disposed on the substrate, wherein a diameter of the sounding structure ranges from 10 μm to 100 μm, and the sounding structure includes:

a first electrode disposed on the substrate;

an insulating layer disposed on a side of the first electrode away from the substrate; and a second electrode disposed on a side of the insulating layer away from the first electrode, wherein the second electrode has a suspended portion spaced apart from and opposite to the insulating layer and a connecting portion extending from a side of the suspended portion to the insulating layer, a sounding cavity is defined between the suspended portion and the insulating layer, the connecting portion is formed to have an opening in communication with the sounding cavity, and when the first electrode and the second electrode receive different driving signals, the suspended portion is capable of vibrating and sounding.

In some embodiments, the second electrode further includes a connecting portion extending from a side edge of the suspended portion to the insulating layer, wherein the connecting portion is formed to have an opening in communication with the sounding cavity.

In some embodiments, the second electrode has a first side edge, and the suspended portion is formed at a position of the second electrode close to the first side edge, and extends to the first side edge.

In some embodiments, a diameter of the sounding structure ranges from 10 μm to 100 μm.

In some embodiments, the substrate is divided into a display area and a non-display area.

The sounding structure is located in the display area and/or the non-display area.

In some embodiments, the substrate is one of a display screen, an array substrate, a back panel, or a cover plate.

In some embodiments, a height of the sounding cavity from the insulating layer to the suspended portion ranges from 1 μm to 5 μm.

In some embodiments, the second electrode has a stepped structure as a whole.

In some embodiments, a material of a second electrode is at least one of titanium, tantalum, molybdenum, or tungsten.

A screen sounding device includes a substrate and a sounding structure disposed on the substrate. The sounding structure includes:

a first electrode disposed on a substrate;

an insulating layer disposed on a side of the first electrode away from the substrate; and a second electrode disposed on a side of the insulating layer away from the first electrode, wherein the second electrode has a suspended portion spaced apart from and opposite to the insulating layer, wherein a sounding cavity is defined between the suspended portion and the insulating layer.

When the first electrode and the second electrode receive different driving signals, the suspended portion is capable of vibrating and sounding.

In some embodiments, the second electrode further includes a connecting portion extending from a side edge of the suspended portion to the insulating layer, wherein the connecting portion is formed to have an opening in communication with the sounding cavity.

In some embodiments, the second electrode has a first side edge, and the suspended portion is formed at a position of the second electrode close to the first side edge, and extends to the first side edge.

In some embodiments, a diameter of the sounding structure ranges from 10 μm to 100 μm.

In some embodiments, the substrate is divided into a display area and a non-display area.

The sounding structure is located in the display area and/or the non-display area.

In some embodiments, the substrate is one of a display screen, an array substrate, a back panel, or a cover plate.

In some embodiments, a height of the sounding cavity from the insulating layer to the suspended portion ranges from 1 μm to 5 μm.

In some embodiments, a material of the second electrode is at least one of titanium, tantalum, molybdenum, or tungsten.

A method for manufacturing a screen sounding device is provided. The manufacturing method includes steps below.

S1: Providing a substrate, and successively manufacturing a first electrode and an insulating layer on the substrate.

S2: Manufacturing a first patterned photoresist layer on the insulating layer, wherein the first patterned photoresist layer is formed to have a first end side and a second end side disposed opposite to each other;

S3: Manufacturing a second electrode on the insulating layer, wherein the second electrode covers the second end side of the first patterned photoresist layer and exposes the first end side of the first patterned photoresist layer.

S4: Stripping the first patterned photoresist layer using a stripper, so that the second electrode obtains a suspended portion, wherein a sounding cavity is defined between the suspended portion and the insulating layer.

When the first electrode and the second electrode receive different driving signals, the suspended portion vibrates and sounds.

In some embodiments, step S3 includes steps below.

S301: Manufacturing a second electrode layer on the insulating layer, wherein the second electrode layer covers the insulating layer and wraps the first end side and the second end side of the first patterned photoresist layer.

S302: Manufacturing a second photoresist layer on the second electrode layer, and patterning the second photoresist layer to obtain a second patterned photoresist layer, wherein one side of the second patterned photoresist layer is aligned to the first end side of the first patterned photoresist layer, and an other side of the second patterned photoresist layer covers the second end side of the first patterned photoresist layer; and

S303: Patterning the second electrode layer to obtain the second electrode, wherein the second electrode covers the insulating layer and the first patterned photoresist layer, and exposes the first end side of the first patterned photoresist layer.

Beneficial Effects

According to the screen sounding device in the embodiments of the present disclosure, the sounding structure composed of the first electrode, the second electrode, and the insulating layer is used to meet the requirement for the non-porous display screen. In addition, the problem of driving the display screen to vibrate and high energy consumption can also be resolved. Moreover, the sounding cavity of the present disclosure can be obtained by the difference in the reaction mechanism between a to-be-stripped material and the second electrode in the stripper, and the depth of the sounding cavity can be precisely controlled. Finally, the screen sounding device of the present disclosure has high process feasibility and low costs, facilitating the thin and light design of display terminal products and enhancing the product grade.

DETAILED DESCRIPTION OF PREFERRED EMBODIMENTS

The present disclosure provides a screen sounding device and a manufacturing method thereof. In order to make the purpose, the technical solution, and the effects of the present disclosure clearer and more explicit, the present disclosure is to be further described in detail with reference to the accompanying drawings and the embodiments. It should be understood that the specific implementations described herein are merely used for explaining the present disclosure rather than limiting the present disclosure.

Figure 1:
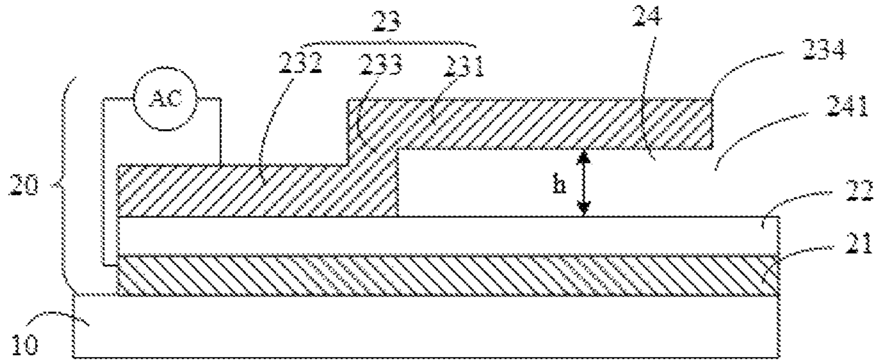
FIG. 1 is a schematic diagram of a screen sounding device according to an embodiment of the present disclosure.

The present disclosure provides a screen sounding device applicable to a display screen. FIG. 1 is a schematic diagram of a screen sounding device according to an embodiment of the present disclosure. As shown in FIG. 1, the screen sounding device of the present disclosure includes a substrate 10 and a sounding structure 20 disposed on the substrate 10. The sounding structure 20 includes a first electrode 21 disposed on the substrate 10, an insulating layer 22 disposed on a side of the first electrode 21 away from the substrate 10, and a second electrode 23 disposed on a side of the insulating layer 22 away from the first electrode 21.

Still referring to FIG. 1, the second electrode 23 has a suspended portion 231 spaced apart from the insulating layer 22, and a sounding cavity 24 is defined between the suspended portion 231 and the insulating layer 22. When the first electrode 21 and the second electrode 23 respectively receive different driving signals, the suspended portion 231 vibrates and sounds.

In more detail, under the action of the different driving signals, the suspended portion 231 can vibrate, and the suspended portion 231 can push the air in the sounding cavity 24 to vibrate during the vibration, so that the sounding structure 20 sounds.

In detail, the different driving signals may be at least AC (alternating current) signals of different frequencies and/or different magnitudes. For example, in the present embodiment, when the first electrode 21 and the second electrode 23 respectively receive current signals of different frequencies, the suspended portion 231 vibrates and sounds.

During detailed implementation, the first electrode 21 and the second electrode 23 are connected to a driving chip by traces. Therefore, the different driving signals can be transmitted to the first electrode 21 and the second electrode 23 by the driving chip.

In order to ensure that the sounding cavity 24 is filled with air, a peripheral side of the sounding cavity 24 is in communication with the outside.

Apparently, in the screen sounding device of the present disclosure, the sounding structure 20 includes only film layers, such as the first electrode 21, the second electrode 23, the insulating layer 22, and the like. In this way, the screen sounding device has a simple overall structure. In addition, on one hand, the sounding structure 20 uses the first electrode 21 and the second electrode 23 to excite vibration, so that the vibrator or the exciter can be omitted, and uses the suspended portion 231 as a vibrating membrane, so as to avoid the requirement of driving the entire display panel to vibrate and high power. On the other hand, the sounding structure 20 further uses the second electrode 23 and the insulating layer 22 to form the sounding cavity 24, so as to reduce the overall thickness of the sounding structure 20. In general, the sounding structure 20 of the present disclosure can realize a thin and light design without affecting the sounding effect of the sounding structure 20, thereby optimizing the user experience. In addition, the sounding structure 20 described in the present disclosure further has various setting positions, low manufacturing costs, and high yields of finished products. In detail, the display screen may be a liquid crystal display (LCD) panel, an organic light-emitting diode (OLED) display panel, or a micro-light-emitting diode (Micro-LED) display panel. The screen sounding device of the present disclosure does not impose any detailed limitation on the type or structure of the applicable display screen.

In detail, the screen sounding device can be disposed inside the display screen, or can be directly disposed on the display screen. It can be seen that the screen sounding device of the present disclosure has various setting positions.

The screen sounding device of the present disclosure and the detailed arrangement mode of the screen sounding device of the present disclosure will be described in detail with reference to FIG. 1 below.

As shown in FIG. 1, the substrate 10 is configured to support the sounding structure 20, and the substrate 10 provides a vibration wave (sound wave) reflection surface for the sounding structure 20, so as to be desirably applicable to the screen sounding of a full screen.

The substrate 10 may be at least one of a display screen, an array substrate, a color filter substrate, a back panel, a cover plate, or a base substrate. Apparently, the screen sounding device can be disposed inside the display screen, or can be directly disposed on the display screen. It can be seen that the screen sounding device of the present disclosure has various setting positions.

In detail, the substrate 10 may be the display screen. In this case, the sounding structure 20 can be directly disposed on a surface of a light exit side of the substrate 10, or can be disposed on a surface of a non-light-exit side of the substrate 10.

In this case, the screen sounding device can be integrated in the manufacturing of the display screen, and the sounding device and the display screen can be manufactured at one time. In this way, the overall process flow is simplified, and costs are saved.

In detail, the substrate 10 may be the array substrate or the color filter substrate. In this case, the screen sounding device is disposed inside the display screen.

For example, in the present embodiment, the substrate 10 is the array substrate. The substrate 10 includes a base substrate and a driving circuit layer disposed on the base substrate. The sounding structure 20 is disposed on the driving circuit layer. Certainly, in other embodiments, the sounding structure 20 can further be arranged in other function layers in the substrate 10. For example, the substrate 10 further includes a packaging layer, and the sounding structure 20 may further be disposed in the packaging layer.

For another example, in the LCD panel, the substrate 10 may be a color filter substrate, and in this case, the sounding structure 20 can be disposed on the color filter substrate.

In detail, the substrate 10 may be a cover plate disposed on a light exit side of the display screen. That is to say, the sounding structure 20 can be disposed on a cover plate of a display device.

In detail, the substrate 10 may be a back panel disposed on a non-light-exit side of the display screen. That is to say, the sounding structure 20 can be disposed on a back panel of the display device.

In detail, the substrate 10 may further be a general base substrate. In this case, the screen sounding device may be an additional structure attached to the display screen, so as to be compatible with the conventional display device, facilitating the upgrading.

During the detailed implementation, a hard glass substrate 10 may be used as the base substrate to ensure the stability of the chamber, thereby ensuring the stable sounding.

As shown in FIG. 1, the sounding structure 20 is disposed on the substrate 10. The substrate 10 is divided into a display area and a non-display area. The sounding structure 20 is located in the display area and/or the non-display area. In more detail, the sounding structure 20 may be disposed only in the non-display area of the substrate 10, or may be arranged only in the display area of the substrate 10, and may be arranged both in the display area and in the non-display area.

In detail, the arrangement mode and the configuration of the structure or the size of the sounding structure 20 in the display area and the non-display area may be same or different. For ease of manufacturing and assembly, the configurations of the sounding structure 20 in the display area and the non-display area are same.

In detail, a diameter of the sounding structure 20 ranges from 10 μm to 100 μm. That is to say, the sounding structure 20 of the present disclosure is a pixel-level micro-sounding structure or a quasi-pixel-level micro-sounding structure. With such arrangement, the sounding structure 20 can realize precise directional sounding under the control of the driving chip, thereby improving the sounding effect. In another aspect, the sounding structure 20 can be integrated in the manufacturing of the display screen, and the sounding device and the display device can be manufactured at one time. In this way, the overall process flow is simplified, and costs are saved.

However, when the display panel is the OLED display panel, due to the pursuit of thinner and lighter OLED display screens, in some embodiments, the screen sounding device is an integrated structure manufactured integrally with the OLED display panel.

For example, in the OLED display screen, a light-emitting device layer is usually configured to dispose light-emitting devices. Since the light-emitting devices are not closely arranged, in the light-emitting device layer, a gap between the light-emitting devices can be used for disposing the pixel-level sounding structure 20. That is to say, an orthographic projection of the sounding structure 20 on the substrate 10 falls between orthographic projections of the light-emitting devices on the substrate 10.

As shown in FIG. 1, the sounding structure 20 includes the first electrode 21, the insulating layer 22, and the second electrode 23 sequentially stacked on the substrate 10.

As shown in FIG. 1, the first electrode 21 is disposed on the substrate 10.

During the detailed implementation, the first electrode 21 may be a single-layer film structure or a multilayer stack film structure, which is not limited in the present disclosure.

For example, in the present embodiment, the first electrode 21 is a conductive film layer disposed as a single layer.

During the detailed implementation, a material of the first electrode 21 is not limited. For example, in the present disclosure, the material of the first electrode 21 may be at least one of titanium, tantalum, molybdenum, or tungsten. In other embodiments, the material of the first electrode 21 may further be aluminum.

As shown in FIG. 1, the insulating layer 22 is disposed on the first electrode 21 to separate the first electrode 21 from the second electrode 23. During the detailed implementation, a material of the insulating layer 22 is at least one of $SiO_2$, $SiN_x$, or $SiON_x$.

During the detailed implementation, the insulating layer 22 may be disposed individually for each of the sounding structures 20, or may be arranged in the form of a continuous film layer.

As shown in FIG. 1, the second electrode 23 is disposed on the insulating layer 22, and the second electrode 23 has a suspended portion 231 opposite to the insulating layer 22. The suspended portion 231 is used to form the sounding cavity 24. In addition, the suspended portion 231 can also push the air in the sounding cavity 24 to vibrate, and serve as a vibrating membrane.

In the sounding structure 20 of the present disclosure, the vibration of the suspended portion 231 of the second electrode 23 is used to replace the vibration of the entire substrate 10 or the display screen, so as to reduce the power of the entire sounding device. Moreover, since the second electrode 23 is mated with the first electrode 21 to excite vibration, the suspended portion 231 can be directly and efficiently driven to vibrate.

As shown in FIG. 1, the second electrode 23 includes the suspended portion 231, the attaching portion 232, and the connecting portion 233.

As shown in FIG. 1, the suspended portion 231 is spaced apart from the insulating layer 22. That is to say, the suspended portion 231 is suspended opposite to the insulating layer 22. The suspended portion 231 is used to form the sounding cavity 24. In addition, the suspended portion 231 can serve as the vibrating membrane that pushes the air in the sounding cavity 24 to vibrate.

In a preferred embodiment, the suspended portion 231 is parallel to the insulating layer 22 and is opposite to and spaced apart from the insulating layer 22. As shown in FIG. 1, the attaching portion 232 is attached to a side of the insulating layer 22 away from the first electrode 21 to realize the attachment and fixation of the entire second electrode 23 on the insulating layer 22. That is to say, the entire second electrode 23 is fixed to the insulating layer 22 by the attaching portion 232.

In detail, in order to prevent the second electrode 23 from being separated from the insulating layer 22, the surfaces of the insulating layer 22 and the attaching portion 232 may be modified and designed to increase the adhesion between the second electrode 23 and the insulating layer 22. Alternatively, some blind holes or groove structures on the surface of the insulating layer 22 are added, so that the attaching portion 232 is embedded in the insulating layer 22.

As shown in FIG. 1, the connecting portion 233 extends from a side edge of the suspended portion 231 to the insulating layer 22 to support the suspended portion 231. In detail, the connecting portion 233 is located on the periphery of the suspended portion 231 and extends from the side edge of the suspended portion 231 to a side edge of the attaching portion 232.

In a preferred embodiment, the suspended portion 231 and the attaching portion 232 are respectively located on two opposite sides of the connecting portion 233, and two ends of the connecting portion 233 in a vertical direction are perpendicularly connected to the attaching portion 232 and the suspended portion 231 respectively.

As shown in FIG. 1, the connecting portion 233 is formed to have an opening 241. The opening 241 communicates with the sounding cavity 24 and allows the sounding cavity 24 to communicate with the outside. The sounding cavity 24 is always filled with air, so that the vibration and sounding can be realized. In addition, during the manufacturing process of the sounding cavity 24, the opening 241 can also expose a to-be-stripped material filled in the sounding cavity 24, facilitating the stripping of the to-be-stripped material.

During the detailed implementation, in the patterning process of forming the second electrode 23, the opening 241 may be obtained by etching or removing a partial area of the connecting portion 233.

As shown in FIG. 1, the suspended portion 231 is formed at a position of the second electrode 23 close to an outer edge of the second electrode and extends to the outer edge of the second electrode 23. Still referring to FIG. 1, the second electrode 23 has a first side edge 234, and the suspended portion 231 is formed at a position of the second electrode 23 close to the first side edge 234, and extends to the first side edge 234.

As shown in FIG. 1, in the present embodiment, the second electrode 23 has a stepped structure as a whole.

In the present embodiment, a material of a second electrode layer 203 is at least one of titanium, tantalum, molybdenum, or tungsten.

As shown in FIG. 1, the sounding cavity 24 is defined between a suspended portion 231 of a second electrode layer 203 and the insulating layer 22. The sounding cavity 24 is hollow, and since the sounding cavity 24 communicates with the outside through the opening 241, the sounding cavity 24 is always filled with air.

In the process of manufacturing the sounding structure 20, the attaching portion 232 of the second electrode 23 covers the insulating layer 22, and the suspended portion 231 of the second electrode 23 covers the to-be-stripped material layer. In this case, the sounding cavity 24 is filled with the to-be-stripped material. Based on the mechanism of the difference in the reactions of the to-be-stripped material with the first electrode 21, the second electrode 23, and the insulating layer 22 in the stripper (the stripper only reacts with the to-be-stripped material), the to-be-stripped material is stripped to obtain the suspended portion 231, and the size of the sounding cavity 24 can be precisely controlled.

The sounding structure 20 of the present disclosure has a simple structure design, high process feasibility, and low costs. Especially in the full-screen display screen, the sounding structure can sound more desirably, and the opening of the full-screen can be reduced.

When the sounding cavity 24 has a relatively large space, the vibration amplitude of the suspended portion 231 is relatively large. In a preferred embodiment, a height h of the sounding cavity 24 from the suspended portion 231 to the insulating layer 22 ranges from 1 μm to 5 μm. However, it should be noted that, no limitation is imposed on the height h of the sounding cavity 24 in the present disclosure.

Based on a same design concept, the present disclosure further provides a method for manufacturing a screen sounding device. As shown in FIG. 2 to FIG. 5, the manufacturing method includes steps below.

S1: Providing a substrate 10, and successively manufacturing a first electrode 21 and an insulating layer 22 on the substrate 10.

S2: Manufacturing a first patterned photoresist layer 31 on the insulating layer 22, wherein the first patterned photoresist layer 31 is formed to have a first end side 31*a* and a second end side 31*b* disposed opposite to each other.

S3: Manufacturing a second electrode 23 on the insulating layer 22, wherein the second electrode 23 covers the second end side 31*b* of the first patterned photoresist layer 31 and exposes the first end side 31*a* of the first patterned photoresist layer 31.

S4: Stripping the first patterned photoresist layer 31 using a stripper, wherein the second electrode 23 obtains a suspended portion 231, and a sounding cavity 24 is defined between the suspended portion 231 and the insulating layer 22.

The first electrode 21 and the second electrode 23 receive different driving signals, the suspended portion 231 pushes the air in the sounding cavity 24 to vibrate during the vibration, so that the sounding structure 20 sounds.

The method for manufacturing a screen sounding device of the present disclosure can be used to manufacture the screen sounding device of the present disclosure. The detailed implementation of the method for manufacturing a screen sounding device of the present disclosure will be described in detail with reference to FIG. 2 to FIG. 5 below.

Figure 2:
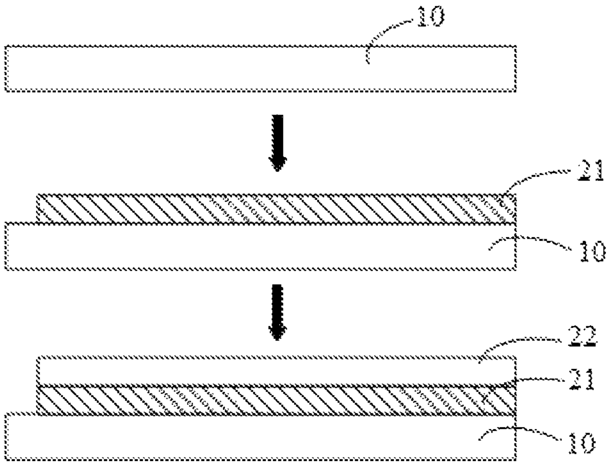
FIG. 2 to FIG. 5 are process flowcharts of a screen sounding device according to an embodiment of the present disclosure.

Referring to FIG. 2, in step S1, the substrate 10 may be any of an array substrate, a display screen, a back panel, a cover plate, a color filter substrate, and a base substrate according to the preset arrangement position of the screen sounding device in the display screen.

In the present embodiment, the substrate 10 is the array substrate. In other embodiments, the cover plate or the back panel may further be selected according to the actual structure or design of the display screen or the display device. The display screen may be an LCD panel, an OLED display panel, or a micro-LED display panel, which is not limited in the present disclosure.

A material of the first electrode 21 is any one or a combination of titanium, tantalum, molybdenum, and tungsten, which is not limited in the present disclosure. A material of the insulating layer 22 is at least one of $SiO_2$, $SiN_x$, or $SiON_x$.

Figure 3:
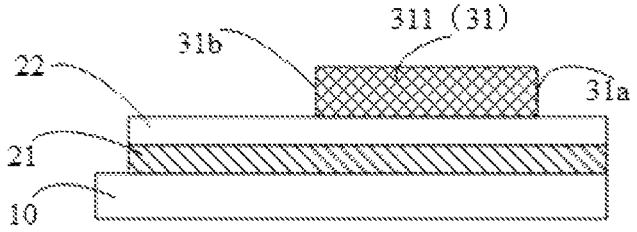

Referring to FIG. 3, in step S2, a first photoresist layer is manufactured on the insulating layer 22, and the first photoresist layer is patterned to obtain the first patterned photoresist layer 31.

The first patterned photoresist layer 31 correspondingly forms the subsequent sounding cavity 24, and the first end side 31*a* of the first patterned photoresist layer 31 corresponds to the opening 241. A thickness of the first patterned photoresist layer 31 is same as the height h of the sounding cavity 24 from the insulating layer 22 to the suspended portion 231.

During the detailed manufacturing, the first patterned photoresist layer 31 occupies the sounding cavity 24 for forming the suspended portion 231 and the connecting portion 233 of the second electrode 23, and can be stripped by the stripper in the subsequent steps.

Referring to FIG. 3, in the present embodiment, the first patterned photoresist layer 31 includes a plurality of photoresist blocks 311 arranged in an array on the substrate 10. During the manufacturing, the photoresist blocks 311 occupy the sounding cavity 24 and can be stripped, thereby obtaining the suspended portion 231.

During the detailed implementation, the size parameter of the photoresist block 311 can be adjusted to control the size of the sounding cavity 24. For example, by adjusting the thickness of the photoresist block 311, the height of the sounding cavity from the second electrode 23 to the insulating layer 22 is controlled. However, it should be noted that no limitation is imposed on the thickness of the first patterned photoresist layer 31 in the present disclosure.

In a preferred embodiment, the thickness of the first patterned photoresist layer 31 ranges from 1 μm to 5 μm.

During the detailed implementation, both the film formation and patterning process of the first patterned photoresist layer 31 can be achieved by conventional processes, and details will not be described herein again.

Figure 4:
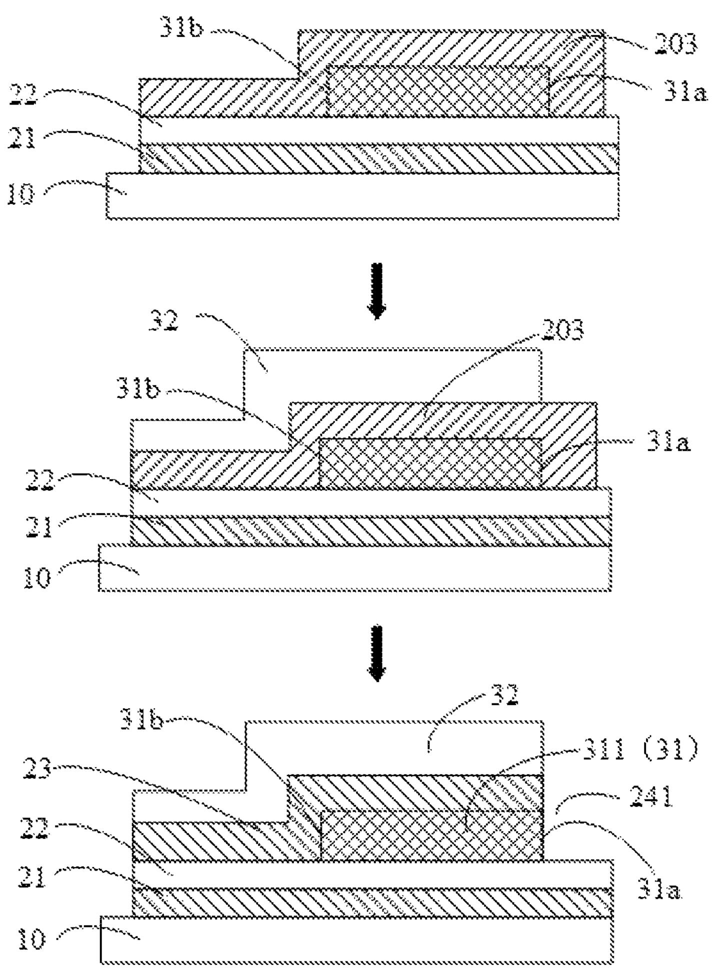
Figure 5:
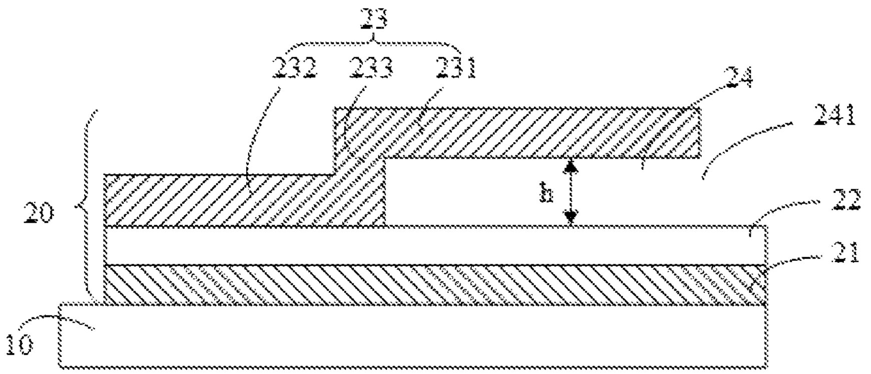

Referring to FIG. 4, in the present embodiment, step S3 includes steps below.

S301: Manufacturing the second electrode layer 203 on the insulating layer 22, wherein the second electrode layer 203 covers the insulating layer 22 and wraps the first end side 31*a* and the second end side 31*b* of the first patterned photoresist layer 31.

In the present embodiment, a material of the second electrode layer 203 is at least one of titanium, tantalum, molybdenum, or tungsten, which is not limited in the present disclosure.

S302: Manufacturing a second photoresist layer on the second electrode layer 203, and patterning the second photoresist layer to obtain a second patterned photoresist layer 32, wherein one side of the second patterned photoresist layer 32 is aligned to the first end side 31*a* of the first patterned photoresist layer 31, and an other side of the second patterned photoresist layer 32 covers the second end side 31*b* of the first patterned photoresist layer 31.

In detail, in the step, since the one side of the second patterned photoresist layer 32 is aligned to the first end side 31*a* of the first patterned photoresist layer 31, the second patterned photoresist layer 32 exposes a corresponding part of the second electrode layer 203 on the side, and the other side of the second patterned photoresist layer 32 extends beyond the second end side 31*b* of the first patterned photoresist layer 31.

In the present embodiment, a material of the second photoresist layer is same as a material of the first photoresist layer. In this way, the second photoresist layer can be stripped synchronously in the step of stripping the first patterned photoresist layer 31, reducing the manufacturing process.

In other embodiments, the material of the second photoresist layer is different from the material of the first photoresist layer. No limitation is imposed on the material of the second photoresist layer in the present disclosure.

S303: Patterning the second electrode layer 203 to obtain the second electrode 23, wherein the second electrode 23 simultaneously covers the insulating layer 22 and the first patterned photoresist layer 31, and can expose the first end side 31*a* of the first patterned photoresist layer 31.

Referring to FIG. 4, the first patterned photoresist layer 31 is located between the insulating layer 22 and the second electrode 23, and the second electrode 23 has an opening 241 capable of exposing the first end side of the first patterned photoresist layer 31, so as to facilitate the subsequent stripping of the first patterned photoresist layer 31.

During the manufacturing of the sounding structure 20, based on the mechanism of the difference in the reactions of the first patterned photoresist layer 31 with the first electrode 21, the second electrode 23, and the insulating layer 22 in the stripper (the stripper only reacts with the to-be-stripped material), the first patterned photoresist layer 31 is stripped and covers the corresponding area of the second electrode 23 on the first patterned photoresist layer 31, so as to form the suspended portion 231.

During the detailed implementation, the stripper includes an organic amine and a polar organic solvent. The first patterned photoresist layer 31 and the second patterned photoresist layer 32 are stripped and removed by swelling and dissolving. The stripper does not corrode metals, such as Cu, Al, Mo, Ti, and the like, and therefore will not damage the first electrode 21 and the second electrode 23, and will not cause damage to the metal layer of the display screen.

It may be understood that, for those of ordinary skill in the art, equivalent replacements or changes can be made according to the technical solutions of the present disclosure and the inventive concept thereof, and all these changes or replacements shall fall within the protection scope of the appended claims of the present disclosure.

What is claimed is:

1. A screen sounding device, comprising a substrate and a sounding structure disposed on the substrate, wherein a diameter of the sounding structure ranges from 10 μm to 100 μm, and the sounding structure comprises:

a first electrode disposed on the substrate;

an insulating layer disposed on a side of the first electrode away from the substrate; and a second electrode disposed on a side of the insulating layer away from the first electrode, wherein the second electrode has a suspended portion spaced apart from and opposite to the insulating layer and a connecting portion extending from a side of the suspended portion to the insulating layer, a sounding cavity is defined between the suspended portion and the insulating layer, the connecting portion is formed to have an opening in communication with the sounding cavity, and when the first electrode and the second electrode receive different driving signals, the suspended portion is capable of vibrating and sounding.

2. The screen sounding device as claimed in claim 1, wherein the second electrode has a first side edge, and the suspended portion is formed at a position of the second electrode close to the first side edge, and extends to the first side edge.

3. The screen sounding device as claimed in claim 1, wherein the substrate is divided into a display area and a non-display area, and the sounding structure is located in the display area or the non-display area.

4. The screen sounding device as claimed in claim 1, wherein the substrate is one of a display screen, an array substrate, a back panel, or a cover plate.

5. The screen sounding device as claimed in claim 1, wherein a height of the sounding cavity from the insulating layer to the suspended portion ranges from 1 μm to 5 μm.

6. The screen sounding device as claimed in claim 1, wherein the second electrode has a stepped structure as a whole.

7. The screen sounding device as claimed in claim 1, wherein a material of a second electrode is at least one of titanium, tantalum, molybdenum, or tungsten.

8. A screen sounding device, comprising a substrate and a sounding structure disposed on the substrate, wherein a diameter of the sounding structure ranges from 10 μm to 100 μm, and the sounding structure comprises:

a first electrode disposed on the substrate;

an insulating layer disposed on a side of the first electrode away from the substrate; and a second electrode disposed on a side of the insulating layer away from the first electrode, wherein the second electrode has a suspended portion spaced apart from and opposite to the insulating layer, wherein a sounding cavity is defined between the suspended portion and the insulating layer, and when the first electrode and the second electrode receive different driving signals, the suspended portion is capable of vibrating and sounding.

9. The screen sounding device as claimed in claim 8, wherein the second electrode further comprises a connecting portion extending from a side edge of the suspended portion to the insulating layer, wherein the connecting portion is formed to have an opening in communication with the sounding cavity.

10. The screen sounding device as claimed in claim 9, wherein the second electrode has a first side edge, and the suspended portion is formed at a position of the second electrode close to the first side edge, and extends to the first side edge.

11. The screen sounding device as claimed in claim 8, wherein the substrate is divided into a display area and a non-display area, and the sounding structure is located in the display area or the non-display area.

12. The screen sounding device as claimed in claim 8, wherein the substrate is one of a display screen, an array substrate, a back panel, or a cover plate.

13. The screen sounding device as claimed in claim 1, wherein a height of the sounding cavity from the insulating layer to the suspended portion ranges from 1 μm to 5 μm.

14. The screen sounding device as claimed in claim 8, wherein the second electrode has a stepped structure as a whole.

15. The screen sounding device as claimed in claim 8, wherein a material of a second electrode is at least one of titanium, tantalum, molybdenum, or tungsten.

16. A method for manufacturing a screen sounding device, comprising operations of:

S1: providing a substrate, and successively manufacturing a first electrode and an insulating layer on the substrate;

S2: manufacturing a first patterned photoresist layer on the insulating layer, wherein the first patterned photoresist layer is formed to have a first end side and a second end side disposed opposite to each other;

S3: manufacturing a second electrode on the insulating layer, wherein the second electrode covers the second end side of the first patterned photoresist layer and exposes the first end side of the first patterned photoresist layer, wherein the operation S2 comprises:

S301: manufacturing a second electrode layer on the insulating layer, wherein the second electrode layer covers the insulating layer and wraps the first end side and the second end side of the first patterned photoresist layer;

S302: manufacturing a second photoresist layer on the second electrode layer, and patterning the second photoresist layer to obtain a second patterned photoresist layer, wherein one side of the second patterned photoresist layer is aligned to the first end side of the first patterned photoresist layer, and an other side of the second patterned photoresist layer covers the second end side of the first patterned photoresist layer; and S303: patterning the second electrode layer to obtain the second electrode, wherein the second electrode covers the insulating layer and the first patterned photoresist layer, and exposes the first end side of the first patterned photoresist layer; and S4: stripping the first patterned photoresist layer using a stripper, so that the second electrode obtains a suspended portion, wherein a sounding cavity is formed between the suspended portion and the insulating layer, wherein when the first electrode and the second electrode receive different driving signals, the suspended portion vibrates and sounds.

* * * * *